United States Patent [19]

Mukai

[11] Patent Number: 5,333,031
[45] Date of Patent: Jul. 26, 1994

[54] CAMERA HAVING A LIQUID CRYSTAL FOCUSING SCREEN

[75] Inventor: Hiromu Mukai, Kawachinagano, Japan

[73] Assignee: Minolta Camera Kabushiki Kaisha, Osaka, Japan

[21] Appl. No.: 931,930

[22] Filed: Aug. 18, 1992

[30] Foreign Application Priority Data

Aug. 21, 1991 [JP] Japan ................... 3-235384

[51] Int. Cl.$^5$ ........................... G03B 13/02
[52] U.S. Cl. ........................... 354/442; 354/200; 354/219
[58] Field of Search ........... 354/442, 432, 409, 200, 354/201, 471, 475, 402, 476, 478, 481, 219

[56] References Cited

U.S. PATENT DOCUMENTS

| 3,724,349 | 4/1973 | Von Belvard et al. ........ 354/200 |
| 4,208,115 | 6/1980 | Proske ........................ 354/201 |
| 4,435,047 | 3/1984 | Fergason ...................... 359/334 |
| 4,441,798 | 4/1984 | Watanabe et al. ........... 354/200 X |
| 4,494,853 | 1/1985 | Watanabe ...................... 354/200 X |
| 4,534,639 | 8/1985 | Konishi et al. ................ 354/432 |
| 4,977,424 | 12/1990 | Mukai et al. ................. 354/432 X |

FOREIGN PATENT DOCUMENTS

| 57-109923 | 7/1982 | Japan . |
| 57-37854 | 8/1982 | Japan . |
| 57-124331 | 8/1982 | Japan . |
| 61-60420 | 12/1986 | Japan . |
| 220844 | 1/1990 | Japan . |
| 272324 | 3/1990 | Japan . |
| 3181922 | 8/1991 | Japan . |

*Primary Examiner*—W. B. Perkey
*Attorney, Agent, or Firm*—Price, Gess & Ubell

[57] ABSTRACT

A diffusion degree of a focusing screen is changed by applying voltage to the focusing screen since the focusing screen comprises liquid crystal material whose molecules are penetrated onto a polymer network. The diffusion degree is changed according to the selected exposure mode. Brightness of an object, measured through the focusing screen, is corrected on the basis of applied voltage, an open aperture value and an exit pupil length of a photo-taking lens. Furthermore, the applied voltage, namely, the diffusion degree is changed according to the object brightness.

24 Claims, 13 Drawing Sheets

CAMERA HAVING A LIQUID CRYSTAL FOCUSING SCREEN

BACKGROUND OF THE INVENTION

[1] Field of the invention

The present invention relates to a camera having a liquid crystal focusing screen.

[2] Description of the Prior Art

FIG. 1 is a sectional view of an optical system of a single-lens reflex camera.

A light bundle passes through a photographing lens 10 and is divided into two parts on a main mirror 11. One is reflected by the main mirror 11 to the viewfinder side, and then, forms an image on a focusing screen 12. The formed image is observed through a pentaprism 13 and an eyepiece 14. Close to the eyepiece 14, a lens for light measuring 15 and a light measuring sensor 16 are provided. The lens for light measuring 15 and the light measuring sensor 16 measure the light bundle led from the pentaprism 13. The other light bundle which was divided passes through the translucent main mirror 11, and is reflected by a sub mirror 17, and then, is led to an AF module 18 which carries out focus detection. The photographing lens 10 represents lens groups consisting of plural lenses. An aperture 19 is usually provided among the plural lenses of the photographing lens 10. A film provided at the optical axis of the photographing lens 10 is not shown in FIG. 1.

The focusing screen 12 is a plastic plate and has a subtly uneven surface thereon so as to cause light diffusion. When a photographer observes an object through a viewfinder, an aperture of the camera is usually opened fully. This is for keeping the view finder bright and for achieving higher precision by strengthening output from the light measuring device (the light measuring sensor 16 in FIG. 1) in light measuring. However, when a shutter is released, the aperture is stopped down to the most suitable size in exposure control or the size selected by the photographer. Therefore, the photographer can not confirm the depth of field of a printed picture before the shutter is released. A method of stopping down the aperture with a preview button (not shown) to the practically controlled size in photographing so as to confirm the depth of field through the viewfinder is known. By this method, the viewfinder turns dark and it is hard to observe an object therethrough. Another problem is that the depth of field observed through the viewfinder varies when the open aperture value is altered according to a change of photographing lenses.

To confirm the depth of field of a printed picture through the viewfinder without decreasing the brightness of the viewfinder and the output of the light measuring device, a method of varying a light diffusion degree of a liquid crystal focusing screen has been proposed.

In case of using a liquid crystal member as a focusing screen, the following four points should be considered.

1. Kind of liquid crystal having diffusiveness

For example, liquid crystal of DSM (dynamic scattering mode) (Japanese Laid-Open Patent Application No. Hei. 2-20844) and that of a macromolecule dispersion type (Japanese Laid-Open Patent Application No. Hei. 2-72324) has been proposed. In the liquid crystal of a macromolecule dispersion type, liquid crystal domains 21 are dispersed in a macromolecule 20 as shown in FIG. 2.

2. Time to change the light diffusion degree

Japanese Examined Patent Publication No. Sho. 61-60420 and Japanese Laid-Open Utility Model Application No. Sho. 54-120933 disclose a liquid crystal focusing screen where the light diffusion degree is changed according to the judgement whether the focus is in or out. Namely, in this liquid crystal focusing screen, the light diffusion degree is lowered under the in-focus condition so that the light bundle can permeate therethrough and it is heightened under the out-of-focus condition.

Japanese Laid-Open Patent Application No. Sho. 57-124331 discloses a liquid crystal focusing screen where the light diffusion degree is lowered under an auto-focus mode so that the light bundle can permeate therethrough and it is heightened under a manual-focus mode.

3. Correction of a light measuring value

The brightness of the viewfinder varies according to a change of the light diffusion degrees. Therefore, a light measuring value is required to be corrected when the light measuring is carried out on the basis of the light bundle through the focusing screen. For example, in Japanese Laid-Open Patent Application No. Sho. 57-109923, the light measuring value is corrected when applied voltage to the liquid crystal is switched on or off.

4. Brightness of the viewfinder

Japanese Examined Patent Publication No. Sho. 57-37854 discloses a liquid crystal focusing screen where applied voltage to the liquid crystal is changed according to altering of the open aperture value of a photographing lens, in order to provide a bright viewfinder.

However, from the above-mentioned four points of view, there are still other problems solved by the present invention.

1. In the DSM liquid crystal focusing screen, liquid crystal molecules move disorderly when voltage is applied. Then, the permeating light is scattered, and an object can not be observed clearly when the scattered light is magnified by an eyepiece of the camera. Furthermore, in this case, high voltage is needed, so that consumption power increases. In the macromolecule dispersion type liquid crystal focusing screen shown in FIG. 2, liquid crystal domains have space among themselves. Therefore, the light diffusion degree is uneven, so that an object can not be observed clearly when a magnification of the eyepiece is large.

2. Photographing effect, which is expected by a photographer, is different according to exposure modes. For example, in aperture priority mode a picture is taken with the depth of field considered, while in shutter priority mode it is almost taken without considering it. Therefore, even if the light diffusion degree of liquid crystal is changed according to an (in/out-of) focus condition or an (auto/manual) focus mode, it is yet unsatisfactory.

3. In correction of a light measuring value only according to switching on or off of the applied voltage as disclosed in Japanese Laid-Open Patent Application No. Sho. 57-109923, errors in light measuring are large and proper brightness information can not be obtained.

4. When a photographing lens having a large open aperture value is mounted on a camera, it is difficult to keep the viewfinder bright only by changing the applied voltage according to the open aperture value.

SUMMARY OF THE INVENTION

Accordingly, it is an object of the present invention to provide a camera having a liquid crystal focusing screen which is capable of:

1. keeping an object image observed through the viewfinder clear even when the image is magnified by the eyepiece and keeping the power consumption low;
2. confirming the photographing effect in accordance with the exposure modes;
3. obtaining the proper brightness information; and
4. keeping the viewfinder bright.

Other objects and advantages of the present invention will become apparent from the detailed description to follow taken in conjunction with the appended claims.

DETAILED DESCRIPTION OF THE PREFERRED EMBODIMENT

An embodiment of the present invention is described with reference to the accompanying drawings.

Figure 3A:
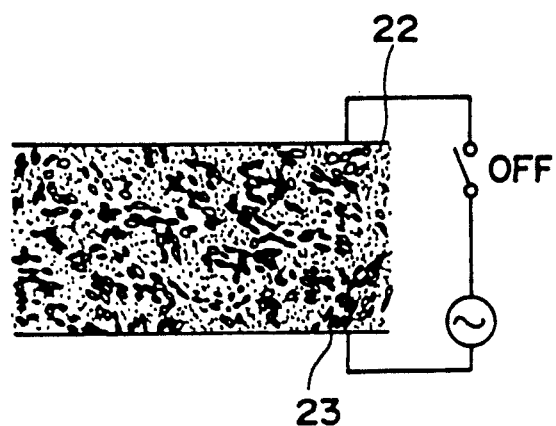
FIG. 3(a) and 3(b) is an illustration of a structure of liquid crystal material used as a focusing screen of the present invention.
Figure 3B:
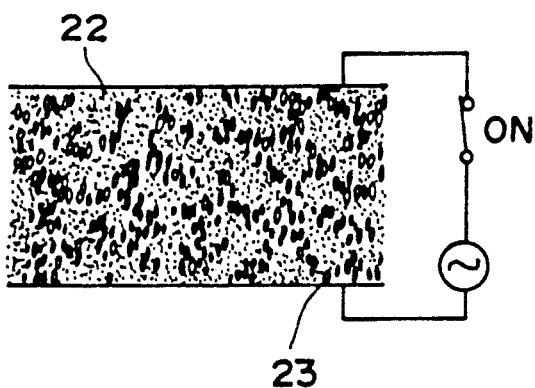

FIGS. 3a and 3b is a schematic structure of liquid crystal screen used as a focusing screen of the present invention.

Figure 2A:
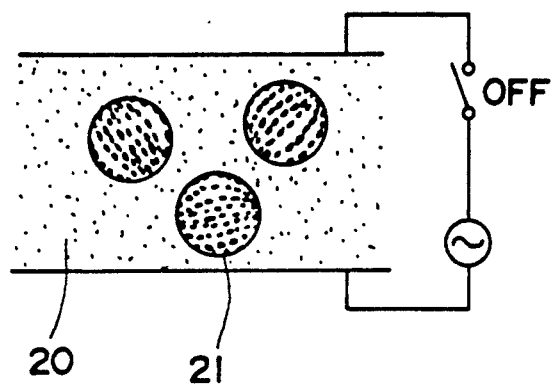
FIGS. 2(a) and 2(b) is an illustration of a structure of a liquid crystal display of a macromolecule dispersion type used as a focusing screen of the prior art.
Figure 2B:
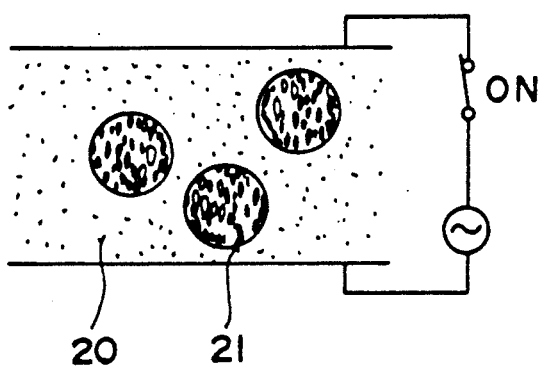

As shown in FIGS. 3a and 3b, liquid crystal molecules 23 are distributed in a polymer network. Compared with the domain structure shown in FIGS. 2a and 2b, liquid crystal molecules 23 are dispersed equally. Therefore, when an object image is magnified by the eyepiece, it can be observed evenly.

TN (Twisted Nematic) liquid crystal, which is used as usual display, requires using a polarizing filter, so that a viewfinder using the TN liquid crystal is dark. Liquid crystal of the present invention does not require a polarizing filter and there is no loss of light caused by the polarizing filter. Consequently, the viewfinder using the liquid crystal of the present invention is bright.

Conditions for using the liquid crystal of the present invention as a focusing screen are described hereinafter.

The brightest lens has a f-number 1.0. When the diameters of an allowed circle of confusion is 1/30 mm, an allowable error in focusing, that is, an error which can be ignored even if the film surface is different from the image forming plane is expressed as $F \times \delta$, about 30 $\mu$m. Therefore, when the thickness of the liquid crystal is 30 $\mu$m or less, the focus can be detected in the precision of 30 $\mu$m in focus detection through the viewfinder, wherever the light is diffused at the liquid crystal. When the liquid crystal is too thin, enough diffusion degree can not be obtained since the number of the molecules decreases. Thus, the desirable thickness of the liquid crystal is about 1 $\mu$m to 30 $\mu$m.

In the present invention, a nematic liquid crystal having positive dielectric anisotropy (Np liquid crystal) is used. The dielectric constant of the Np liquid crystal is higher than that of a nematic liquid crystal having a negative dielectric anisotropy (Nn liquid crystal), so that the applied voltage can be reduced. Therefore, the Np liquid crystal is more suitable for a focusing screen of a viewfinder of a camera than the Nn liquid crystal.

Figure 1:
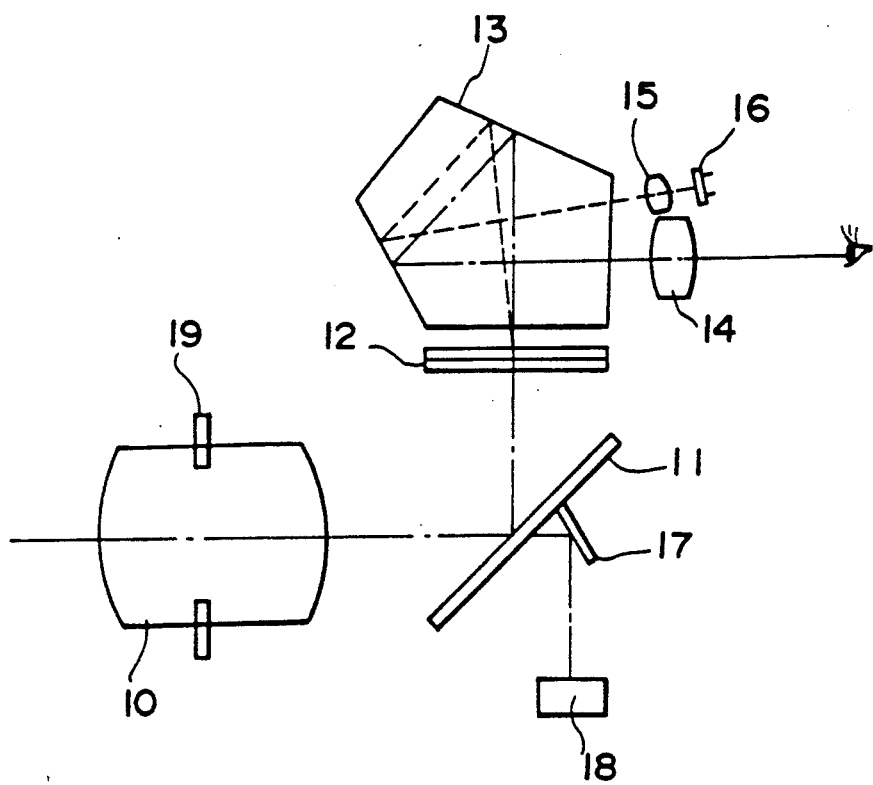
FIG. 1 is a sectional view of an optical system of a single-lens reflex camera.
Figure 4:
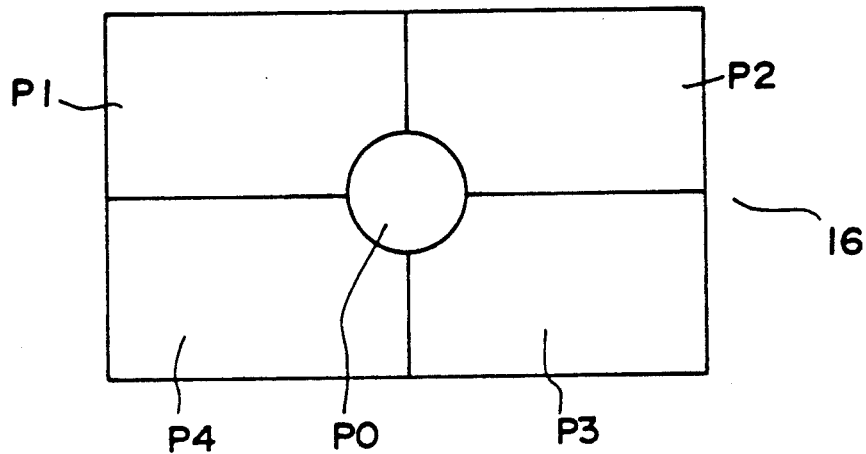
FIG. 4 is an illustration of an example of a light measuring sensor which is divided for proper light measurement.

FIG. 4 is an example of the light measuring sensor 16 (shown in FIG. 1) which is divided for proper light measurement.

The light measuring sensor 16 consists of five elements, P0, P1, P2, P3 and P4. Each of them respectively outputs a brightness value Bv0, Bv1, Bv2, Bv3 or Bv4. On the basis of the five Bv values, an aperture value Av and a shutter speed Tv are determined for exposure control.

Figure 5:
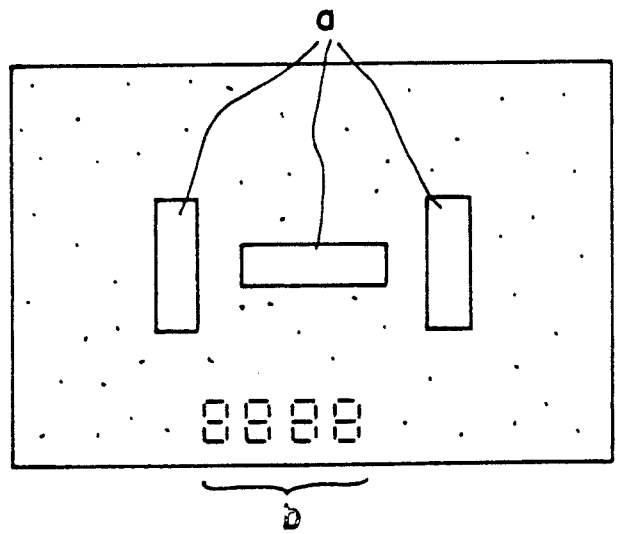
FIG. 5 is an illustration of a viewfinder using liquid crystal as a focusing screen.

FIG. 5 is an illustration of a viewfinder using a liquid crystal material as a focusing screen.

Reference a shows focus detecting areas where the voltage is applied so that the diffusion of the liquid crystal can be reduced and so that the light bundle can permeate therethrough. When the focus detecting areas have a certain diffusion, it is hard to observe an object to be focused if the object is largely out of focus. When the focus detecting areas allow the light bundle to permeate, the object to be focused can be clearly observed even if the object is largely out of focus. Moreover, by controlling the light diffusion degree at the focus detecting areas so as to be the same as that of the other parts of the viewfinder (namely, in the case that the light bundle is not allowed to permeate the focus detecting areas) under the in-focus condition, a display for confirming the in-focus condition is possible. The display is also possible by controlling the diffusion degree at the focus detecting areas so as to allow the light bundle to permeate an focus detecting areas under the in-focus condition, as disclosed in the prior art. However, when the light bundle is allowed to permeate the focus detecting areas, the depth of field cannot be observed. Therefore, to confirm the depth of field of the printed picture through the viewfinder, it is more practical to control the light diffusion degree so as to be equal all over the viewfinder after the object is in focus.

In the above described embodiment, only the diffusion at the focus detecting area is changed according to the condition of in/out-of-focus. It is also suitable to control the diffusion not only at the focus detecting areas but at the whole areas of the viewfinder. While the present embodiment concerns the focus detecting areas, the control of the diffusion degree can be used for displaying an area in the spot light measuring.

Reference b shows a display of such as a shutter speed and an aperture value. The display provided in the picture of the viewfinder as shown in FIG. 5 can be observed better than a display provided out of the picture of the viewfinder. With the liquid crystal in the present embodiment, since the response of the molecules of the liquid crystal is so quick, a dynamic driving of the liquid crystal is possible and a great deal of display can be realized. As a content of the display, a shutter speed, an aperture value, a film sensitivity, a focal length of a photographing lens and such are suitable. In addition, an exposure mode (a program mode, an aperture priority mode, a shutter speed priority mode, and a manual mode) and a warning and flash needing mark and such are also considered to be possible.

Figure 6:
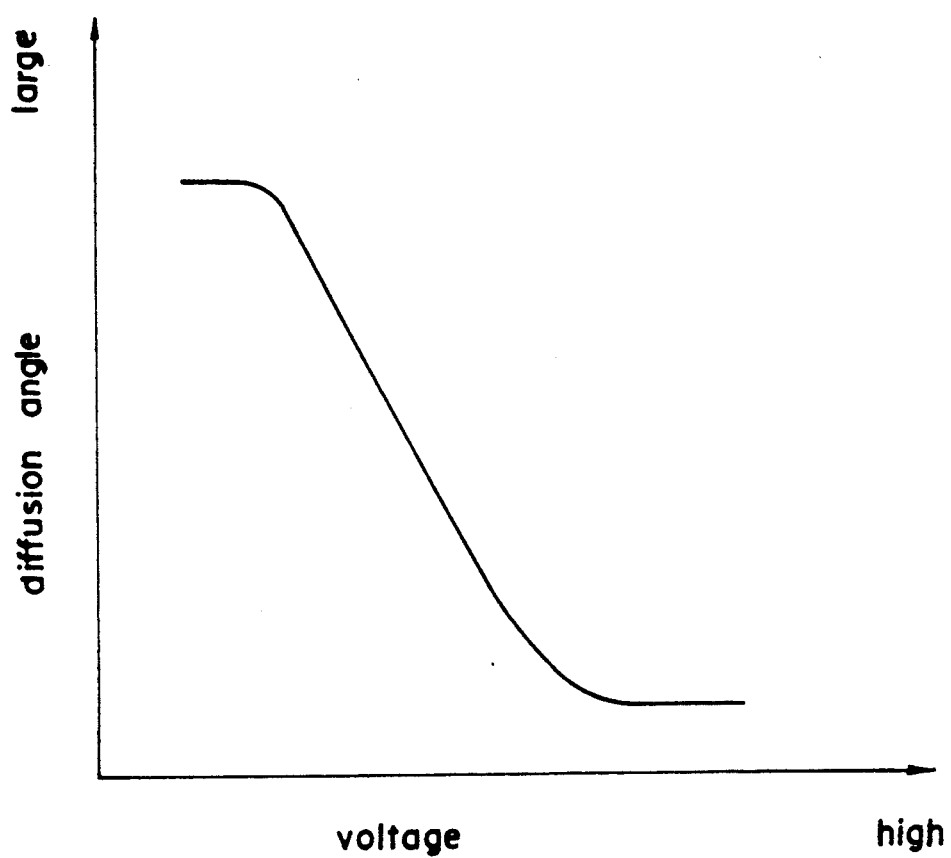
FIG. 6 is a graph showing a relationship between a diffusion angle of the liquid crystal of the present embodiment and liquid crystal driving voltage.

FIG. 6 is a graph showing a relationship between a diffusion angle of the liquid crystal of the present embodiment and liquid crystal applied voltage.

As shown in FIG. 6, the liquid crystal of the present embodiment is capable of changing its diffusion angle by varying the voltage. When the voltage is not applied, the directions of the liquid crystal molecules are various and the light is diffused. When the voltage is applied, the liquid crystal molecules turn toward one direction and the diffusion degree is lowered. As the result, the maximum light transmittance becomes about 80%, so that a bright viewfinder can be realized.

Figure 7:
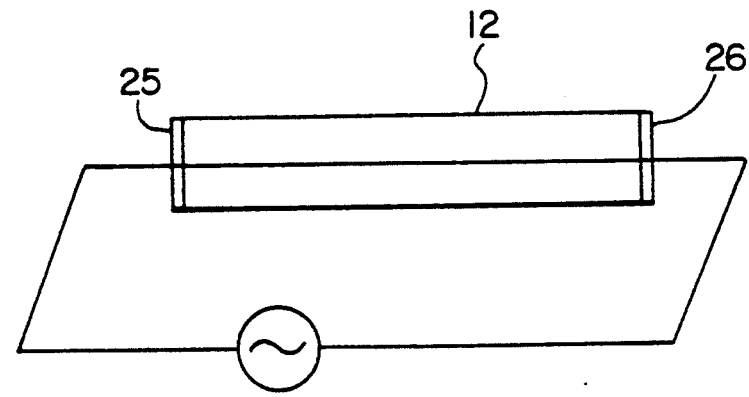
FIG. 7 is an illustration of a method to apply voltage to the liquid crystal of the present embodiment.

FIG. 7 is an illustration of the way how to apply voltage to the liquid crystal of the present embodiment.

In the conventional TN type liquid crystal, in order to control the direction of the liquid crystal molecules, transparent electrodes are attached to the glass surfaces sandwiching the liquid crystal so as to apply voltage. In the present embodiment, it is possible to apply voltage at the side of the liquid crystal substrate (the focusing screen 12). When electrodes 25 and 26 are provided on the side, the electrodes are not required to be transparent and can be formed on the glass surfaces by vacuum evaporation. Then, an increase in transmittance, a reduced cost, and a improvement in confidence can be achieved.

Figure 8:
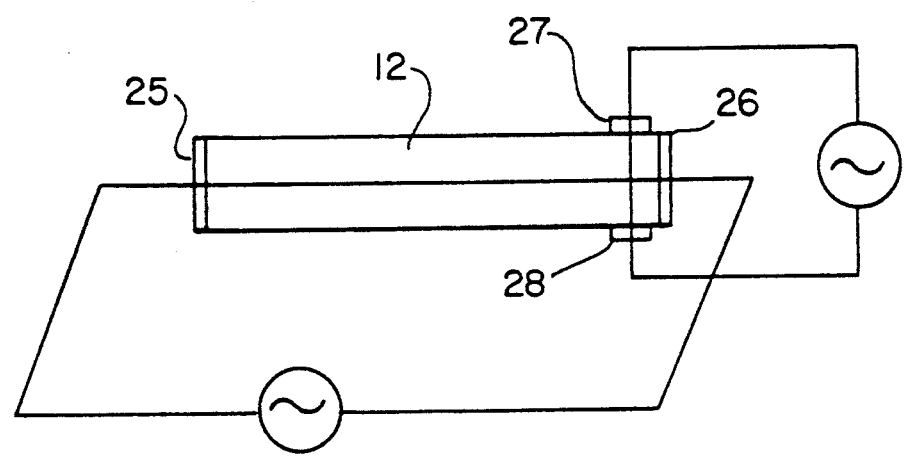
FIG. 8 is an illustration of a method to apply voltage in the case of displaying a numeral and such in the picture of the viewfinder.

FIG. 8 is an illustration of a method to apply voltage in the case of displaying a numeral and such in the picture of the viewfinder (refer to FIG. 5b).

Voltage is applied at the side of the focusing screen in order to control the diffusion degree of the whole focusing screen. At the same time, transparent substrates are provided respectively at the place corresponding to the display parts so as to control the display in the picture of the viewfinder. Even in the case of displaying a numeral and such, transparent electrodes 27 and 28 are required to be provided only at the display parts. The productivity can accordingly increase and the cost can be reduced.

Figure 9:
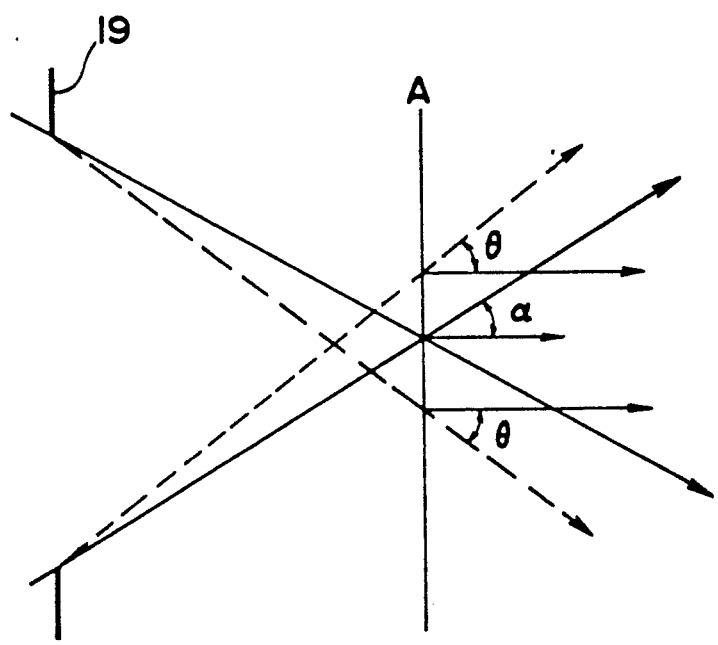
FIG. 9 is an illustration showing a principle of how an image is observed vaguely through a focusing screen.

FIG. 9 is an illustration showing a principle how an image is observed vaguely through a focusing screen.

In FIG. 9, straight lines show the in-focus condition and broken lines show the out-of-focus condition. The light bundle shown by the broken lines has a certain spread. This spread of the light bundle is exposed as an out-of-focus image on a film surface. In a viewfinder, when a focusing screen having diffusiveness is provided at a focal plane A, an image being in focus at the focal plane A is observed sharply. However, an image being out of focus at the focal plane A is observed vaguely because the focusing screen diffuses the light bundle. When the light bundle is incident on the focusing screen at the angle $\theta$ as shown by the broken lines, the diffusing degree is controlled so as to diffuse the light bundle almost perpendicularly to the focusing screen. Then, the light bundle incident on a photographer's eye appears with the nearly equal spread to the spread exposed as an out-of-focus image on a film surface, so that a photographer can confirm the focusing condition surely.

When the diffusion angle is controlled according to an f-number of a photographing lens, a more precise focusing condition (that is, a depth of field) can be confirmed. Namely, according to the f-number, an incident angle $\alpha$ changes as follows:

$$f\text{-number} = 1/(2 \sin \alpha)$$

Therefore, the diffusion angle is controlled on the basis of the angle $\alpha$.

When an aperture 19 is controlled the same as the practical photographing condition, the viewfinder appears darker than when the aperture is open. In the present embodiment, however, since only the depth of field is changed without darkening the viewfinder by varying the diffusion degree of the viewfinder, the depth of field can be observed with the viewfinder bright.

Figure 10:
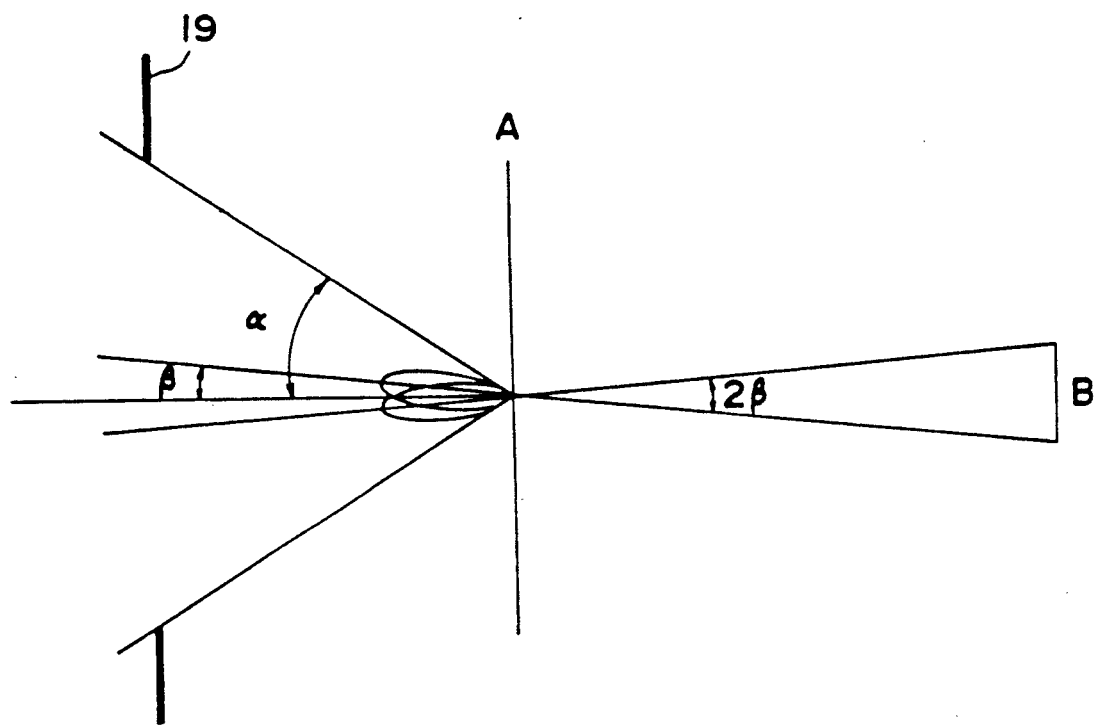
FIG. 10 is an illustration showing a light bundle traced from a pupil B.

FIG. 10 is an illustration showing a light bundle traced from a pupil B.

In FIG. 10, $\beta$ shows an angle incident on the pupil B. When the diffusion degree of the liquid crystal of the focusing screen is precisely controlled on the basis of the above described equation, a part of the light bundle incident on the pupil B is vignetted. When the diffusion angle of the liquid crystal is controlled to be about $(\alpha - \beta)$, the viewfinder can be bright and the out-of-focus condition can be observed properly. The darker an object turns, the larger the diameter of the pupil B gets, so that $\beta$ also gets large. Therefore, when the diffusion angle is changed according to the brightness of an object, a viewfinder focal plane A can be observed even if the object turns dark.

The diffusion angle can be changed either continuously or step by step according to the brightness of an object. The diffusion degree of the liquid crystal is determined based on the balance of the depth of field and the object brightness, namely, the brightness of the viewfinder. The decision is carried out in a later described liquid crystal initial mode routine shown in FIG. 13.

Figure 11:
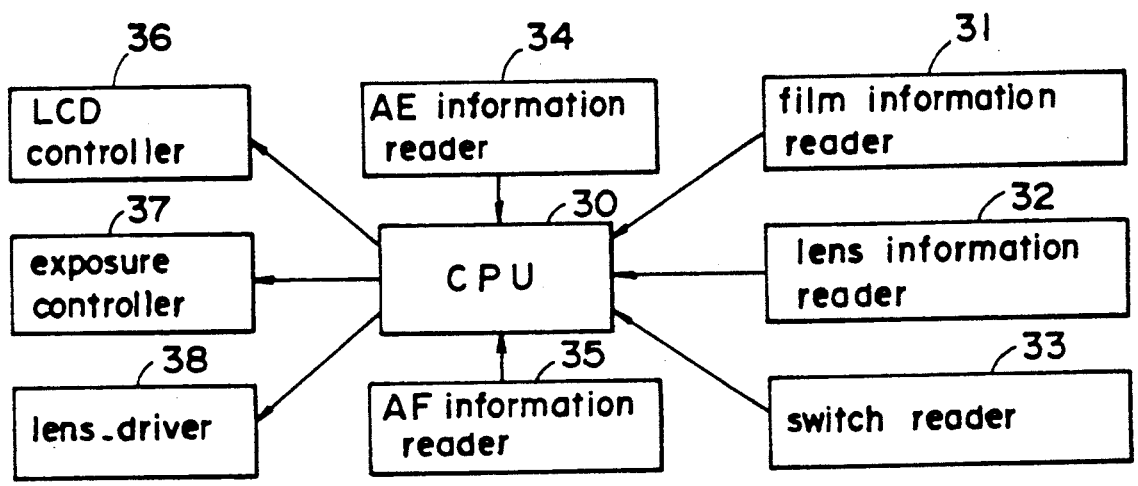
FIG. 11 is a block diagram showing a control system of a camera.

FIG. 11 is a block diagram showing a controlling system of a camera.

CPU 30 controls a camera operation. Film information such as film sensitivity is inputted by a film information reader 31; lens information such as a focal length, an open aperture value (Av0), a minimum aperture value and an exit pupil length, by a lens information reader 32; brightness information from the light measuring device, by an AE information reader 34; information from the AF module, by an AF information reader 35; and switch information such as exposure mode setting and AF/manual switching, by a switch reader 33. With these inputted values, according to the control of the CPU 30, a LCD controller 36 controls the liquid crystal of the focusing screen; an exposure controller 37 controls the exposure; and a lens driver 38 controls lens driving such as zooming and focusing.

The liquid crystal control are concretely described with a flowchart hereinafter.

Figure 12:
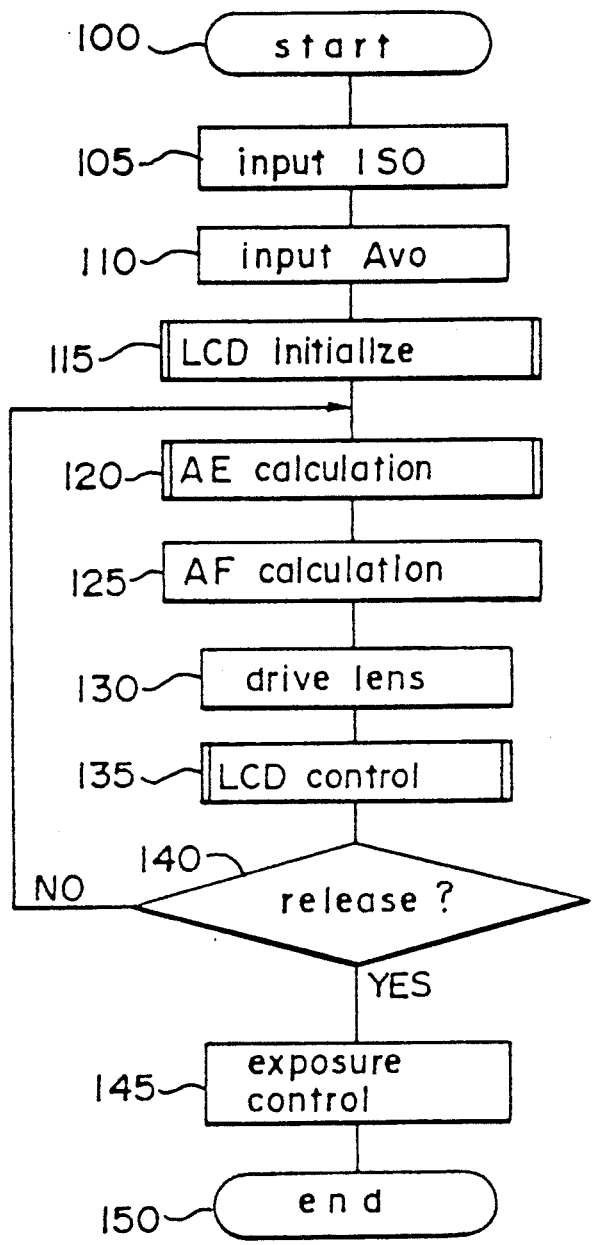
FIG. 12 is a flowchart of a main routine in controlling a camera.

FIG. 12 is a flowchart of a main routine in controlling a camera.

After the main routine starts in accordance with turning on of a main switch of a camera (in step #100), the film sensitivity is inputted in step #105 and the open aperture value Av0 is inputted in step #110. In step #115, the later described LCD initialize mode routine is performed. This routine determines an initial diffusion degree of the liquid crystal on the basis of the Av0 obtained in the step #110.

In step #120, under the diffusion degree initially set in the step #115, an AE calculation routine is carried out. The AE calculation routine calculates control aperture value and/or shutter speed. In step #125, a defocus amount of a lens is calculated on the basis of the information from the AF module. In step #130, a lens is driven for focusing. In step #135, a LCD control routine (later described), which controls the diffusion degree of the liquid crystal, is carried out.

In step #140, it is judged whether or not a release signal is inputted with a release button (not shown). When the release signal is not inputted, the program goes back to the step #120 and repeats the steps #120 to #140 until the release signal is inputted. When the release signal is inputted, a well known exposure control is performed in step #145 and the program ends in step #150.

Figure 13:
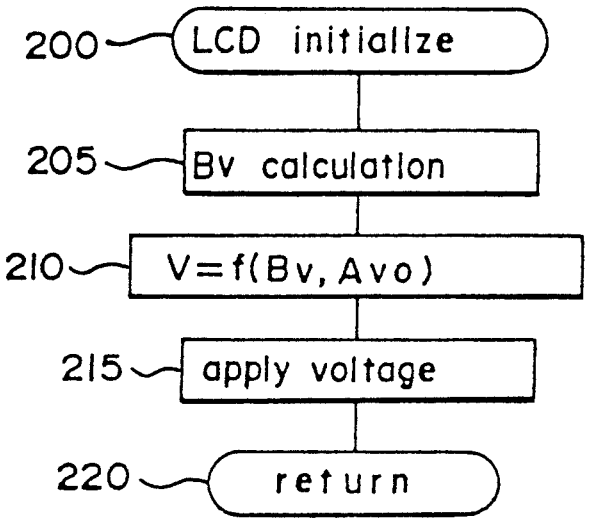
FIG. 13 is a flowchart of a LCD initialize mode routine.

FIG. 13 is a flowchart of the LCD initialize mode routine in the step #115 of the main routine shown in FIG. 12. The LCD initialize mode routine determines the diffusion degree of the liquid crystal, concretely, and the applied voltage of the liquid crystal, considering a relationship between the brightness of the viewfinder and the depth of field.

The LCD initialize mode routine starts in step #200. In step #205, an object brightness value Bv is calculated with the output from the device of the light measuring sensor 16 which is divided in five (shown in FIG. 4). For example, Bv is determined to be an average value calculated as follows:

$$Bv=(Bv0+Bv1+Bv2+Bv3+Bv4)/4$$

In step #210, the applied voltage is calculated according to the brightness value Bv calculated in the step #205 and the open aperture value Av0. In the step #210, when the brightness value Bv is low, the applied voltage V is heightened so as to lower the diffusion degree. A function V=f(Bv, Av0) can be changed step by step as follows:

when $Bv \geq 4$,
$$V = V0 + K \cdot Av0$$
when $0 < Bv < 4$,
$$V = V0 + K \cdot Av0 + VB$$
when $Bv \leq 0$,
$$V = V0 + K \cdot Av0 + 2VB$$

The function V=f(Bv, Av0) can be also changed continuously as follows:

$$V=V0+K \cdot Av0+J \cdot Bv$$

wherein J denotes a constant.

In step #125, the so determined applied voltage V is applied to the liquid crystal, and the liquid crystal obtains a certain diffusion degree practically. The program returns to the main routine in step #220.

Figure 14:
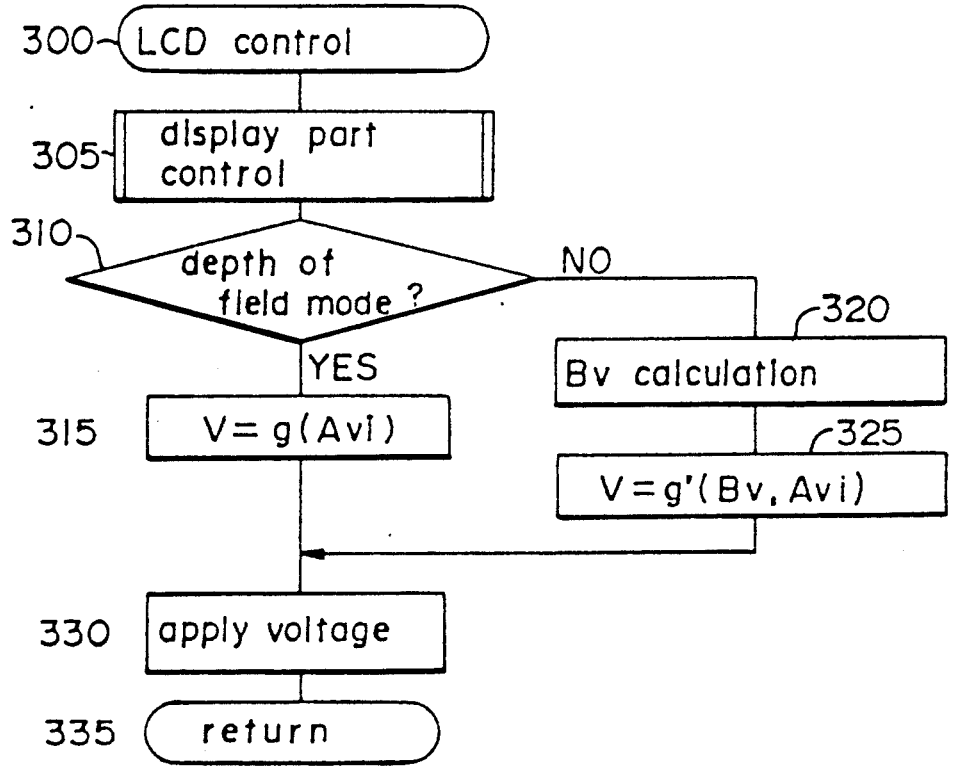
FIG. 14 is a flowchart of a LCD control routine.

FIG. 14 is a flowchart of the LCD control routine in the step #135 of the main routine shown in FIG. 12. The LCD control routine controls the following three operations.

1. Displaying the aperture value and the shutter speed which are determined by the AE calculation;
2. Controlling the AF areas so as to have a certain diffusion degree under the in-focus condition;
3. Controlling the diffusion degree according to whether or not the depth of field mode is set.

In step #305, a later described display part control routine is carried out. In the routine, the AE information and the in-focus condition (that is, the above 1 and 2) are displayed.

In step #310, it is judged whether or not a depth of field mode is set. When the depth of field mode is set, the program goes to step #315. In the step #315, the applied voltage V of the liquid crystal is corrected. The correction is for changing the diffusion degree of the liquid crystal according to the aperture value Avi in exposure control. A function V=g(Avi) is expressed by, for example, a linear function of:

$$V=V0+I \cdot Avi$$

wherein V0 and I denote constants.

The applied Voltage V is set so as to confirm the depth of field at the aperture value Avi. As only the diffusion degree can be changed according to the control aperture without stopping down the aperture, the viewfinder is brighter than in the case of stopping down the aperture in practice.

When the depth of field mode is not set in the step #310, the same Bv calculation as in FIG. 13 is performed in step #320 in order to calculate the object brightness value Bv. In step #325, the applied voltage V is calculated by the brightness value Bv calculated in the step #320 and the aperture value Avi in exposure control. That is, because the depth of field is not required to be precisely confirmed, the viewfinder is kept bright on the basis of the brightness of an object.

In step #330, the applied voltage set as described above is impressed so that the liquid crystal should obtain a certain diffusion degree. The program returns to the main routine in step #335.

In the LCD control routine shown in FIG. 14, it is judged whether or not the depth of field mode is set. As the way of setting the depth of field mode, the followings are supposed.

1. Providing a depth of field mode switch independently

Like a conventional preview button, a button is depressed only when the depth of field is required to be confirmed. The depth of field is confirmed only when it is needed.

2. Setting the aperture priority mode correspondingly

In the aperture priority mode a picture is taken with the depth of field considered. Therefore, it is suitable that the depth of field mode is set in response to the setting of the aperture priority mode.

3. Setting the program mode correspondingly

General photographers use the program mode in most cases, and a combination of the aperture value and the shutter speed is left to a camera. If the depth of field mode is set in response to the setting of the program mode, the effect of the aperture (the depth of field) is always displayed in a viewfinder, so that a photographer can confirm the printed condition of the photograph.

4. Taking no notice of the exposure modes

The depth of field is confirmed in each of the aperture priority mode, the program mode, the shutter speed priority mode and the manual mode.

The depth of field mode can be set in the above described cases. When the manual focusing mode is selected, it is desirable to cancel the depth of field mode automatically or to heighten the diffusion degree, in order to raise the focus detecting precision. If so, the background of a main object is observed vaguely because the diffusion degree is heightened, and the main object to be focused appears clear, so that the in-focus condition is easily judged.

Figure 15:
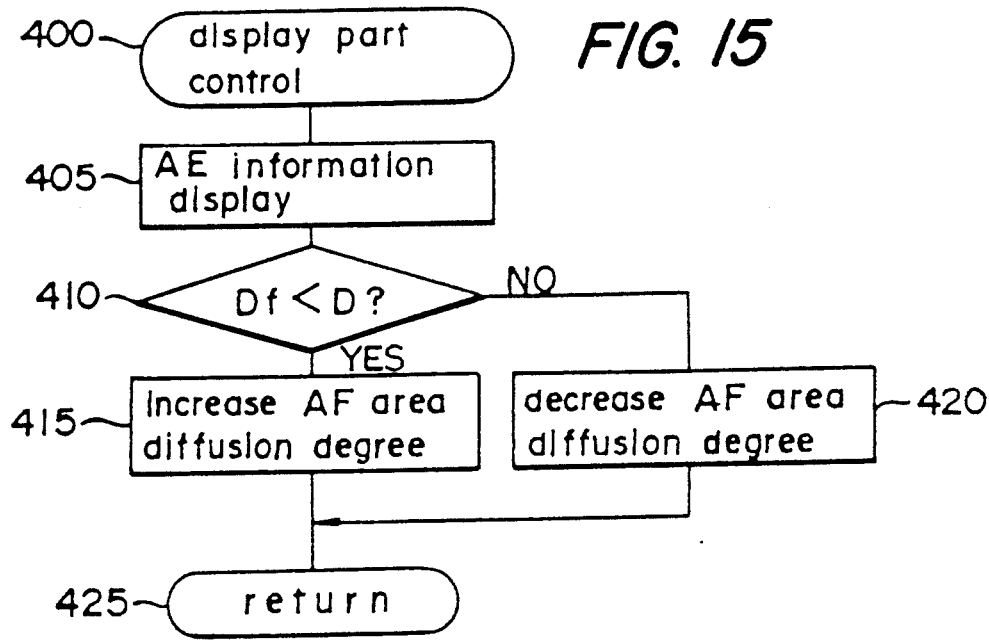
FIG. 15 is a flowchart of a display part control routine.

FIG. 15 is a flowchart of the display part control routine in the step #305 of the LCD control routine shown in FIG. 14.

After the display part control routine starts in step #400, AE information such as an aperture value and a shutter speed is displayed in step #405 at the place b shown in FIG. 5.

In step #410, it is judged whether or not a defocus amount Df is smaller than an in-focus range D. When it is smaller, the focus is in. Therefore, the diffusion degree of the AF area (the focus detecting areas) is increased to an equal degree with the other areas in the focusing screen in step #415. When it is larger, the focus is not in, and accordingly, the diffusion degree of the AF areas is controlled so as to permeate the light bundle in step #420. Then, the program returns to the LCD control routine in step #425.

Figure 16:
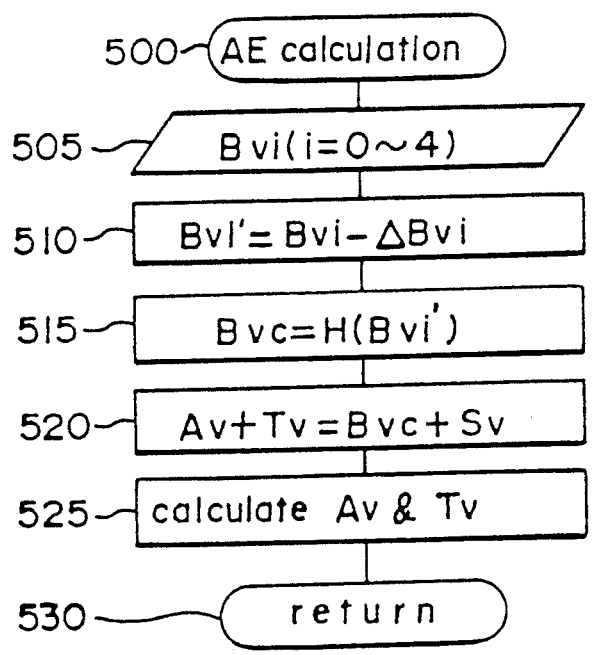
FIG. 16 is a flowchart of an AE calculation routine.

FIG. 16 is a flowchart of the AE calculation routine in the step #120 of the main routine shown in FIG. 12. The AE calculation routine determines the control aperture value Av and shutter speed Tv after calculating the control brightness value Bvc of a camera in accordance with the brightness values Bv0 to Bv4 calculated by the output values from the five light measuring devices of the light measuring sensor 16.

After the AE calculation routine starts in step #500, the brightness information Bvi from the light measuring devices is inputted in step #505. In step #510, the five brightness values are corrected respectively. The correction of the brightness values is determined on the basis of the open aperture value Av0 of a photographing lens and the applied voltage V of the liquid crystal. The correcting value $\Delta Bvi$ is different for every light measuring device. The correcting value $\Delta Bvi$ is determined based on the applied voltage V, because the light amount incident on each light measuring device is different according to the diffusion degree (the driving voltage V). Namely, the correcting value $\Delta Bvi$ is calculated as follows:

$$\Delta Bvi = ei \cdot Av0 + fi \cdot V$$

wherein i=0 to 4 and i and fi are constants.

When V gets large (when the diffusion degree is lowered), the correcting value is needed to be also changed in accordance with the exit pupil length of a photographing lens. When the exit pupil length is expressed as P, the correcting value to be used is calculated as follows:

$$\Delta Bvi = ei \cdot Av0 + gi(P, V)$$

wherein i=0 to 4 and ei is a constant.

gi is described later.

Based on the brightness value Bvi' corrected in the step #510, the control value Bvc is calculated by a certain weighting of the five correcting values in step #515. In step #520, a control exposure value (the aperture value Av+the shutter speed Tv) is calculated by the control brightness value Bvc calculated in the step #515 and the film sensitivity. In step #525, the aperture value Av and the shutter value Tv are calculated in accordance with a predetermined program. Then, the program of the AE calculation routine returns to the main routine.

The function gi(P, V) of the exit pupil length P and the applied voltage V, which is used in the above-mentioned correcting of the brightness value in the case that the diffusion degree is low, is described hereinafter. Since the light measuring sensor 16 (shown in FIG. 1) is provided at a certain angle to the optical axis, such correction is needed. For example, gi(P, V) is expressed as follows:

when $i = 0$
$$gi(P, V) = 0$$
when $i = 1$ or 2,
see Table 1
when $i = 3$ or 4,
see Table 2

When i=0, i.e., the light measuring device is located at the center of the sensor 16, the device is hardly influenced by the exit pupil length and the diffusion degree. Therefore, gi(P, V) can be 0 in the brightness value correction.

When i=1 or 2, i.e., the light measuring device is located correspondingly to the upper part of the picture of the viewfinder, the shorter the exit pupil length of a lens is, the more the exposure is over the proper value, and accordingly, the lesser the diffusion degree is, the more the changing amount is. Namely, when P is short and V is high in Table 1, gi(P, V) is a positive value, and under the other conditions, gi(P, V) is a negative value.

When i=3 or 4, i.e., the light measuring device is located correspondingly to the lower part of the picture of the viewfinder, the longer the exit pupil length of a lens is, the more the exposure is over the proper value, and accordingly, the lower the diffusion degree is, the more the changing amount is. Namely, when P is long and V is high in Table 2, gi(P, V) is a positive value, and under the other conditions, gi(P, V) is a negative value.

TABLE 1

| gi (P, V) under the condition of i = 1 or 2 | | |
|---|---|---|
| P | SHORT | LONG |
| V | | |
| HIGH | + | − |
| LOW | − | − |

TABLE 2

| gi (P, V) under the condition of i = 3 or 4 | | |
|---|---|---|
| P | SHORT | LONG |
| V | | |
| HIGH | − | + |
| LOW | − | − |

Figure 17:
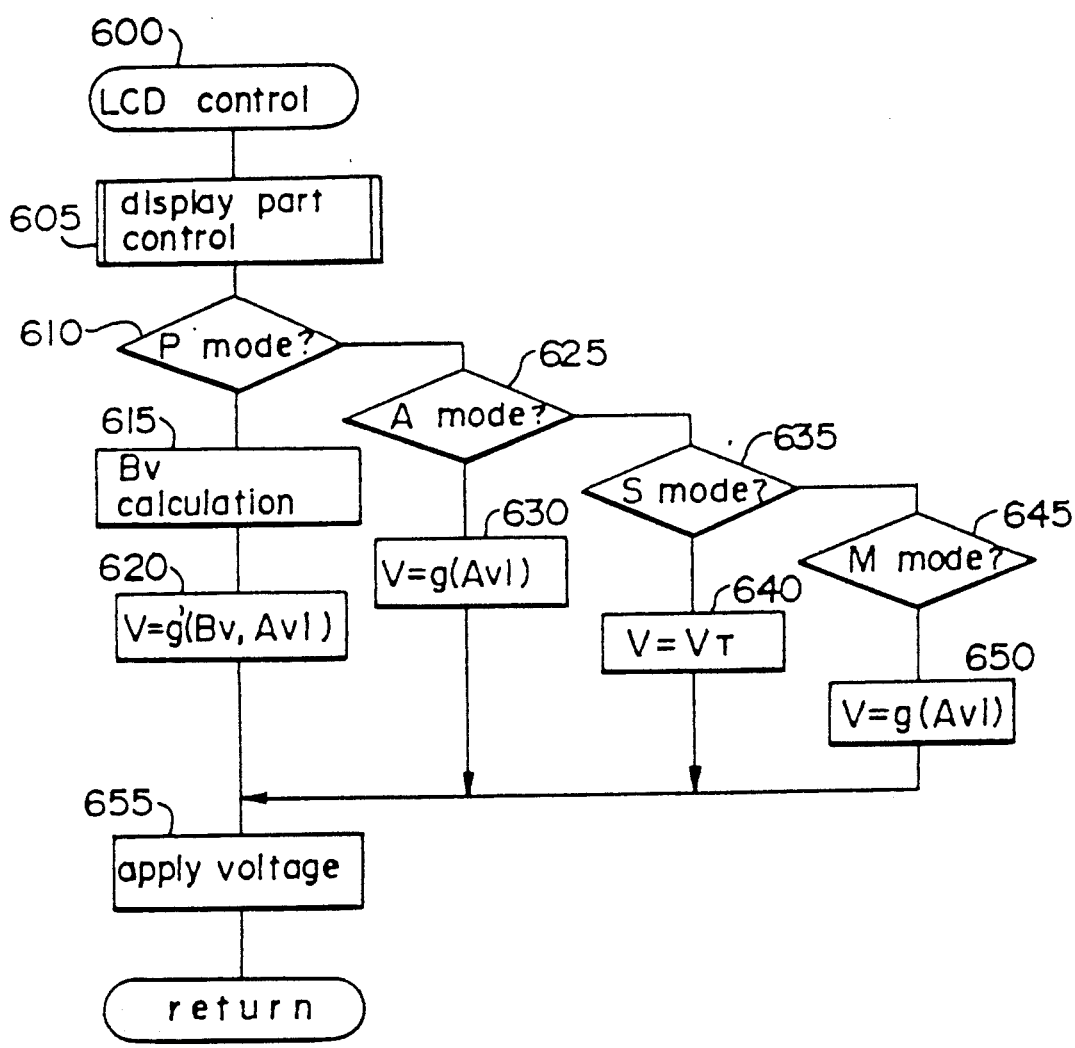
FIG. 17 is a flowchart of another LCD control routine.

FIG. 17 is a flowchart showing another embodiment of the LCD control routine in the step #135 of the main routine shown in FIG. 12. Different from the embodiment shown in FIG. 14, the diffusion degree of the liquid crystal is controlled in accordance with each exposure mode. That is, in the program mode (P-MODE), the applied voltage V is controlled on the basis of the brightness value Bv and the control aperture value Avi (in steps #610 to #620). In other words, the applied voltage V is controlled based on the brightness of an object. When the object is dark, the driving voltage V is heightened so that the viewfinder can be bright. In the aperture priority mode (A-MODE, in steps #625 and #630) and the manual mode (M-MODE, in steps #645 and #650), the applied voltage V is controlled in response to the control aperture value Avi so as to display a correct depth of focus. In the two modes, it can be considered that a photographer takes the depth of focus into account in photographing. In the shutter speed priority mode (S-MODE), it is judged that the depth of focus responding to the control aperture value is not needed to be confirmed. Therefore, the driving voltage V is fixed at VT in order to keep the viewfinder bright. VT is high enough to lower the diffusion degree.

As described above, by automatically changing the control of the applied voltage of the liquid crystal in accordance with the exposure modes, a viewfinder picture is rendered more effective for a photographer.

The applied voltage V calculated in the step #620 in the program mode can be V=g(Avi) so as to respond only to the control aperture value. It also can be V=g(Avo) so as to be set at a fixed value determined on the basis of the open aperture value of a photographing lens.

As described above, in the present embodiments molecules of the liquid crystal used as a focusing screen are penetrated into the polymer network. Consequently, an object can be observed evenly through a viewfinder. Furthermore, since response of the liquid crystal is so quick, a great deal of display such as segment display is possible. Moreover, as a polarizing filter is not used, the viewfinder can be kept bright.

As to light measuring correction, the diffusion degree is varied in response to the control aperture value. That occurs as an error in light measuring. The error is corrected by the aperture, the driving voltage of the liquid crystal, and the exit pupil length, so that proper brightness information can be obtained.

In addition to that, since the applied voltage of the liquid crystal is controlled so as to change in accordance with the object brightness, the diffusion degree can be properly set according to the object brightness. Consequently, the viewfinder can be kept bright.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A camera comprising:
    light measuring means for measuring a brightness of an object and for outputting a brightness value;
    means for calculating a shutter speed and an aperture value on the basis of the brightness value outputted by said light measuring means, wherein the calculating means includes the capability of calculating a plurality of exposure modes and the shutter speed and the aperture values are calculated by different procedures, depending on the particular exposure mode;
    a focusing screen having a liquid crystal whose diffusion degree is changed when an applied voltage to the liquid crystal is changed;
    means for judging which exposure mode is selected; and
    means, according to the selected exposure mode, for selecting a control mode for the applied voltage, wherein a control mode suitable for the selected exposure mode is selected by the selecting means.

2. A camera as claimed in claim 1, wherein the selecting means selects a control mode in which the applied voltage is changed on the basis of a set aperture value when an aperture priority mode is selected, such that an operator can observe an object in an accurate depth of field.

3. A camera as claimed in claim 1, wherein the selecting means select a control mode in which the applied voltage is set at a predetermined voltage in order to decrease the diffusion degree when an shutter priority mode is selected, such that an operator can observe an object brightly through a viewfinder.

4. A camera as claimed in claim 1, wherein the selecting means selects a control mode in which the applied voltage is changed on the basis of a set aperture value when a manual exposure mode is selected, such that an operator can observe an object in an accurate depth of field.

5. A camera as claimed in claim 1, wherein the selecting means select a control mode in which the applied voltage is changed on the basis of an aperture value in an exposure operation and a brightness of an object when a programed exposure mode is selected.

6. A camera as claimed in claim 1, wherein the selecting means select a control mode in which the applied voltage is changed on the basis of an aperture value in an exposure operation when a programed exposure mode is selected, such that an operator can observe an object in an accurate depth of field.

7. A camera as claimed in claim 1, wherein the selecting means select a control mode in which the applied voltage is set on the basis of an open aperture value when a programed exposure mode is selected.

8. A camera as claimed in claim 1 wherein the thickness of the liquid crystal is within a range of 1μ to 30μ.

9. A camera as claimed in claim 1 wherein the liquid crystal is a nematic liquid crystal with a position dielectric anisotropy.

10. A camera as claimed in claim 1 wherein the applied voltage is applied by opaque electrodes.

11. A camera as claimed in claim 1 further including determining a diffusion degree of the liquid crystal before applying a control mode for the applied voltage.

12. A camera as claimed in claim 2 further including means for displaying the aperture value while viewing the focusing screen.

13. A camera as claimed in claim 10 further including means for calculating defocus amount, the focusing screen having a focus detecting area and the diffusion degree of the focus detecting area is varied in response to the calculated defocus amount.

14. A camera as claimed in claim 5 further including a plurality of light measuring devices for calculating values of brightness of the object.

15. A camera as claimed in claim 14 further including means for correcting the brightness values on the basis of aperture value and applied voltage.

16. A camera as claimed in claim 1, wherein the plurality of exposure modes includes at least one of a programed exposure mode, an aperture priority mode, a shutter priority mode, and a manual exposure mode.

17. A camera comprising:
light measuring means for measuring a brightness of an object;
means for calculating a shutter speed and an aperture value on the basis of the brightness measured by said light measuring means, wherein the calculating means includes the capability of calculating a plurality of exposure modes and the shutter speed and the aperture value are calculated by different procedures, depending on the particular exposure mode;
a focusing screen having a liquid crystal whose diffusion degree is changed when an applied voltage to the liquid crystal is changed;
means for judging which exposure mode is selected; and
means for controlling the applied voltage according to the selected exposure mode.

18. A camera as claimed in claim 17, wherein the plurality of exposure modes includes at least one of a programmed exposure mode, an aperture priority mode, a shutter priority mode, and a manual exposure mode.

19. A camera as claimed in claim 17, wherein the controlling means changes the applied voltage on the basis of a set aperture value, such that an operator can observe the object in an accurate depth of field.

20. A camera having a plurality of exposure modes, comprising:
a focusing screen having a liquid crystal whose diffusion degree is changed when an applied voltage to the liquid crystal is changed;
means for judging which exposure mode is selected; and
means, according to the selected exposure mode, for selecting a control mode for the applied voltage, wherein a control mode suitable for the selected exposure mode is selected by the selecting means, wherein the selecting means selects a control mode in which the applied voltage is changed on the basis of a set aperture value when an aperture priority mode is selected, such that an operator can observe an object in an accurate depth of field.

21. A camera having a plurality of exposure modes, comprising:
a focusing screen having a liquid crystal whose diffusion degree is changed when an applied voltage to the liquid crystal is changed;
means for judging which exposure mode is selected; and
means, according to the selected exposure mode, for selecting a control mode for the applied voltage, wherein a control mode suitable for the selected exposure mode is selected by the selecting means, wherein the selecting means selects a control mode in which the applied voltage is set at a predetermined voltage in order to decrease the diffusion degree when a shutter priority mode is selected, such that an operator can observe an object brightly through a viewfinder.

22. A camera having a plurality of exposure modes, comprising:
a focusing screen having a liquid crystal whose diffusion degree is changed when an applied voltage to the liquid crystal is changed;
means for judging which exposure mode is selected; and
means, according to the selected exposure mode, for selecting a control mode for the applied voltage, wherein a control mode suitable for the selected exposure mode is selected by the selecting means, wherein the selecting means selects a control mode in which the applied voltage is changed on the basis of a set aperture value when a manual exposure mode is selected, such that an operator can observe an object in an accurate depth of field.

23. A camera having a plurality of exposure modes, comprising:
a focusing screen having a liquid crystal whose diffusion degree is changed when an applied voltage to the liquid crystal is changed;
means for judging which exposure mode is selected; and
means, according to the selected exposure mode, for selecting a control mode for the applied voltage, wherein a control mode suitable for the selected exposure mode is selected by the selecting means, wherein the selecting means selects a control mode in which the applied voltage is changed on the basis of an aperture value in an exposure operation when a programmed exposure mode is selected, such that an operator can observe an object in an accurate depth of field.

24. A camera having a plurality of exposure modes, comprising:
a focusing screen having a liquid crystal whose diffusion degree is changed when an applied voltage to the liquid crystal is changed;
means for judging which exposure mode is selected;
means for calculating the defocus amount, the focusing screen having a focus detecting area and the diffusion degree of the focus detecting area being varied in response to the calculated defocus amount; and
means, according to the selected exposure mode, for selecting a control mode for the applied voltage, wherein a control mode suitable for the selected exposure mode is selected by the selecting means.

* * * * *